C. CONDERMAN.
PLATFORM WAGON-STEP.

No. 191,030. Patented May 22, 1877.

Witnesses:
George H. Sykes
Chas. J. Buchheit

Caleb Conderman Inventor
by Edward Wilhelm
Attorney

UNITED STATES PATENT OFFICE.

CALEB CONDERMAN, OF HORNELLSVILLE, NEW YORK.

IMPROVEMENT IN PLATFORM WAGON-STEPS.

Specification forming part of Letters Patent No. 191,030, dated May 22, 1877; application filed April 18, 1877.

*To all whom it may concern:*

Be it known that I, CALEB CONDERMAN, of Hornellsville, in the county of Steuben and State of New York, have invented certain new and useful Improvements in Platform Spring-Wagons, which improvements are fully set forth in the following specification, reference being had to the accompanying drawing.

My invention relates to the manner in which the step and the bearing or coupling of the forward end of the rear side spring of a platform spring-wagon are secured to the cross-piece arranged under the platform of the wagon.

Figure 1:
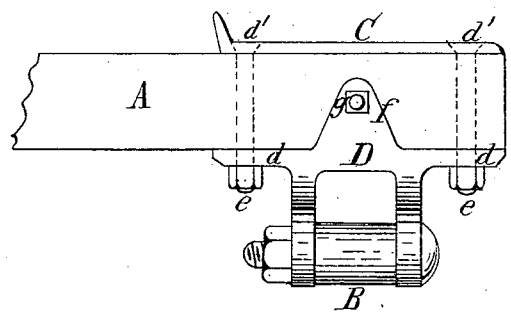
Figure 2:
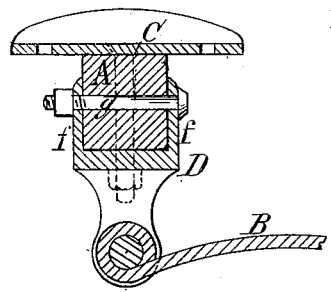

The nature of my invention will be fully understood from the following description:

In the accompanying drawing, Figure 1 is a front elevation of the spring bearing and step attached to the cross-piece. Fig. 2 is a cross-section thereof.

Like letters of reference refer to like parts in each of the figures.

A represents the end of the cross bar or piece secured to the under side of the platform of the wagon, and B the forward end of one of the rear side springs. C represents the tread or step plate, of ordinary form, arranged on the upper side of the cross-bar A. D represents the bearing or coupling by which the spring is connected with the cross-bar A. It is provided with two horizontal flanges, $d$, engaging under the bar A, and secured thereto by vertical bolts $e$ passing through the tread C, and provided at their upper ends with heads $d'$ countersunk into the tread. $f\,f$ represent two side flanges formed with the coupling D, so as to engage against the sides of the bar A and act as braces, and $g$ a fastening-bolt passing horizontally through the flanges $f\,f$ and bar A, or at right angles to the bolt $e$. By this arrangement of the bolts the spring-coupling is secured to the bar A in a most firm and reliable manner, and all tendency of the bar A to split under a heavy strain is thereby avoided. The tread C forms a washer for the bolts $e$, adding to the strength and durability of the spring fastening without any additional expense. The tread C and coupling D are readily cast of malleable iron, and easily secured in place after boring the necessary holes in the bar A, the whole forming a very simple, cheap, and reliable fastening for the spring coupling and step.

Having thus fully described my invention, what I claim as new, and desire to secure by Letters Patent, is—

1. The spring-coupling D, provided with horizontal flanges $d$ and vertical flanges $f$, and secured to the bar A by bolts $e$ and $g$, arranged at right angles to each other, substantially as and for the purpose hereinbefore set forth.

2. The combination, with the bar A, of the tread C and spring-coupling D, arranged respectively on the upper and lower sides of the bar A and connected thereto by the same bolts $e$, having their heads countersunk in the tread, substantially as and for the purpose hereinbefore set forth.

CALEB CONDERMAN.

Witnesses:
C. ADSIT,
C. W. ETZ.